Aug. 6, 1929.　　　T. P. LITTLE ET AL　　　1,723,565
METHOD AND APPARATUS FOR BUILDING BAND TIRE CARCASSES
Filed Aug. 12, 1926　　　8 Sheets-Sheet 5
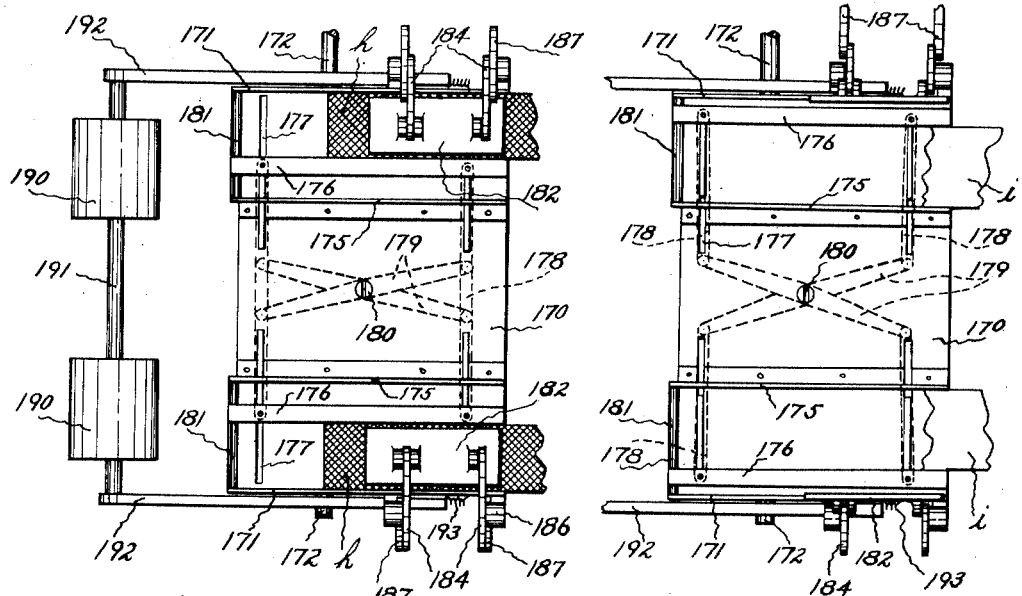
Fig. 20.　　Fig. 21.
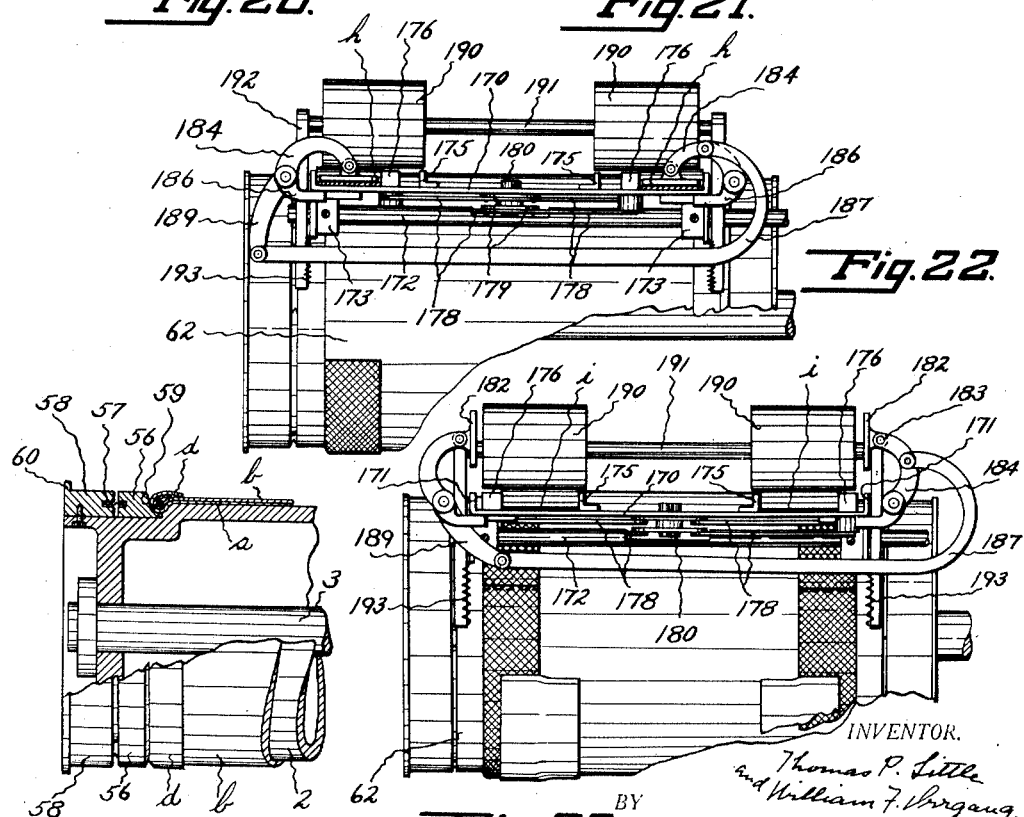
Fig. 22.
Fig. 24.　　Fig. 23.
INVENTOR.
Thomas P. Little
and William F. Ihrgang
Franklin J. Neal
BY
ATTORNEY.

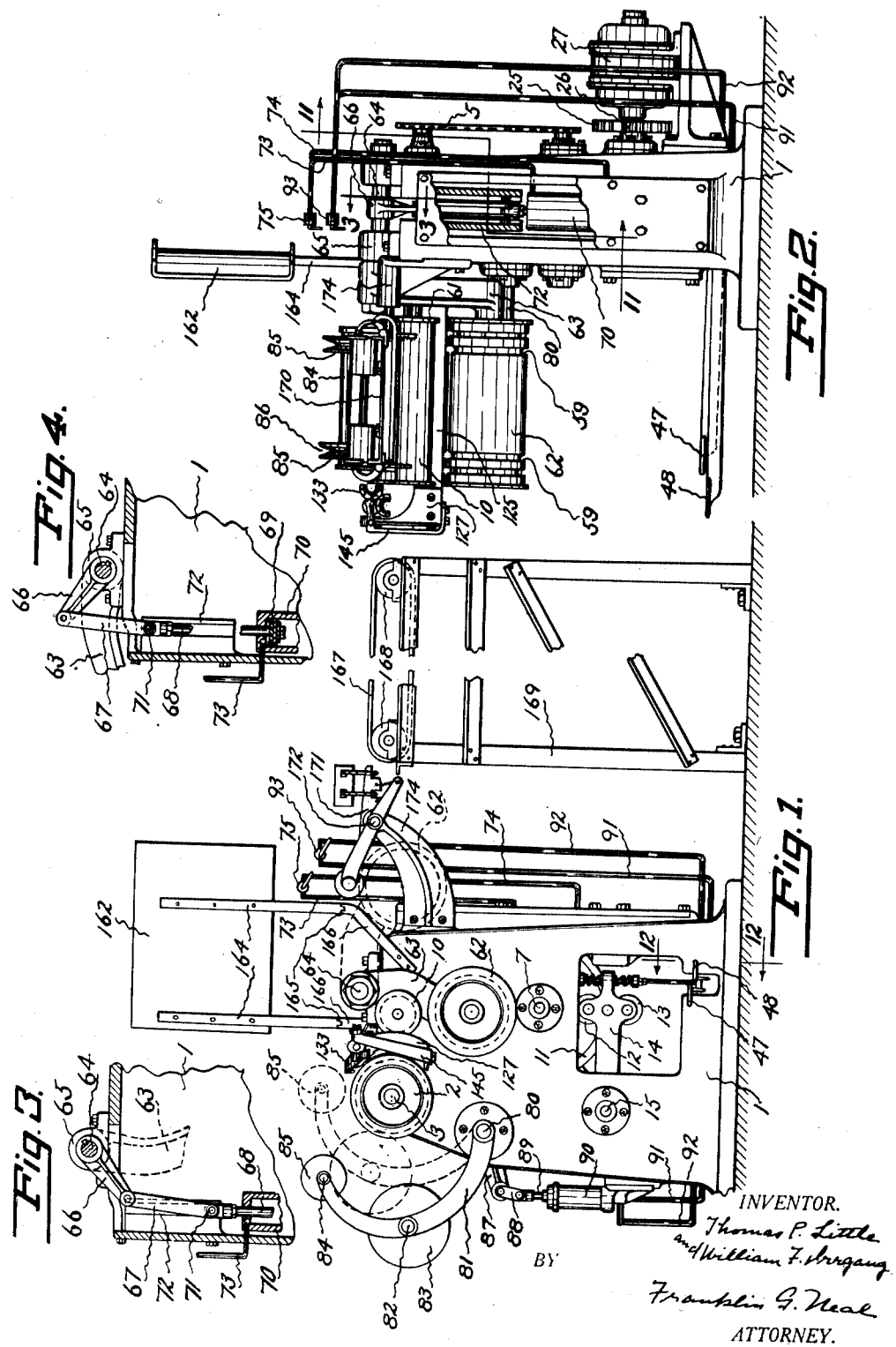

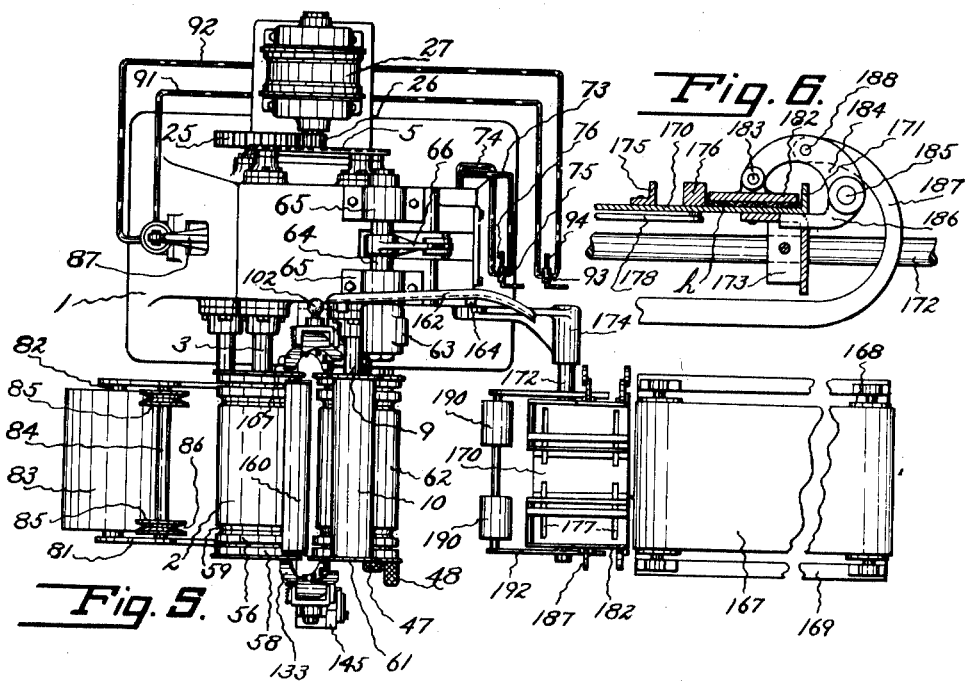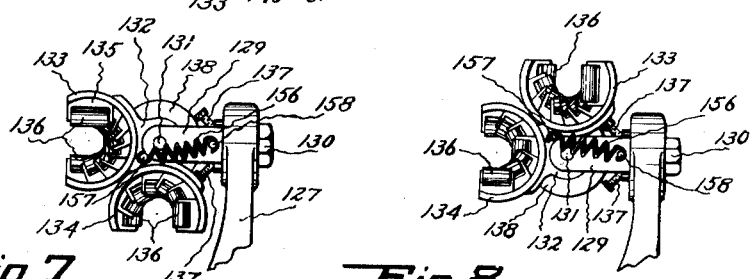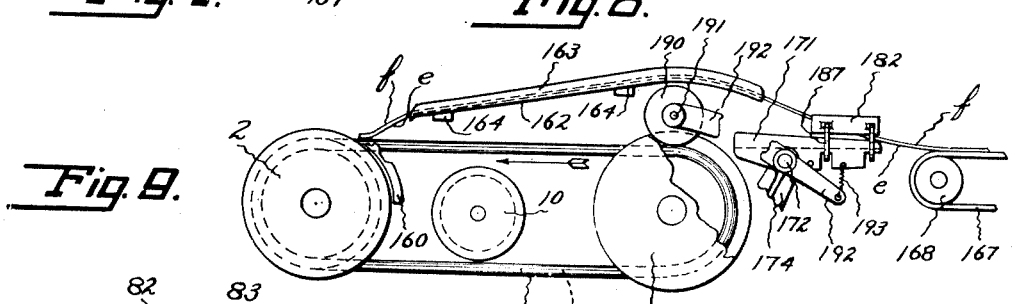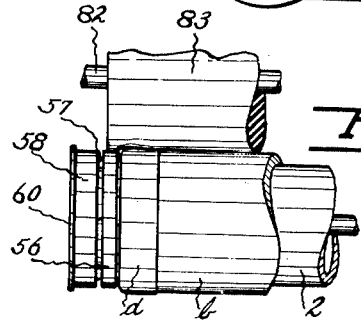

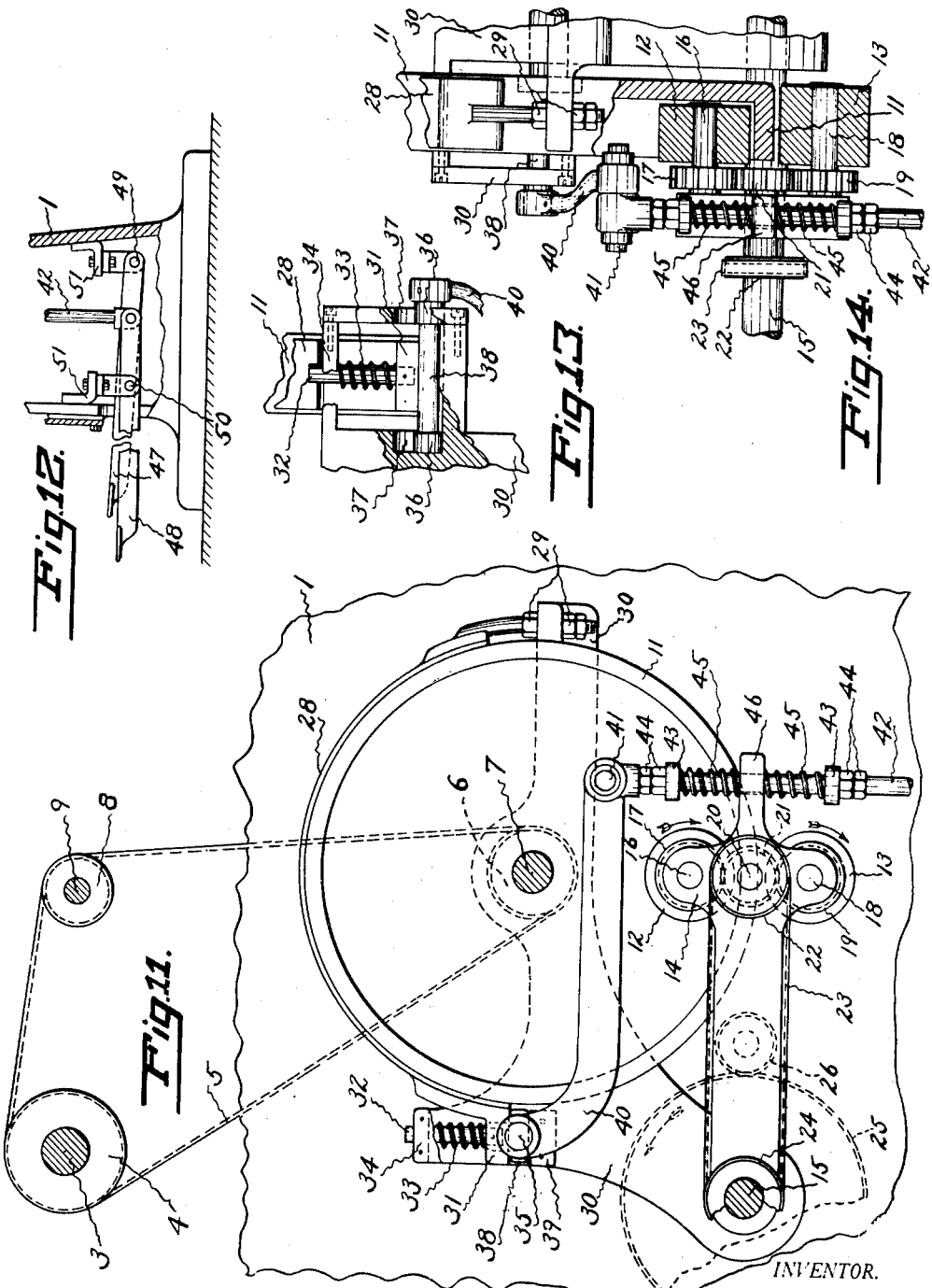

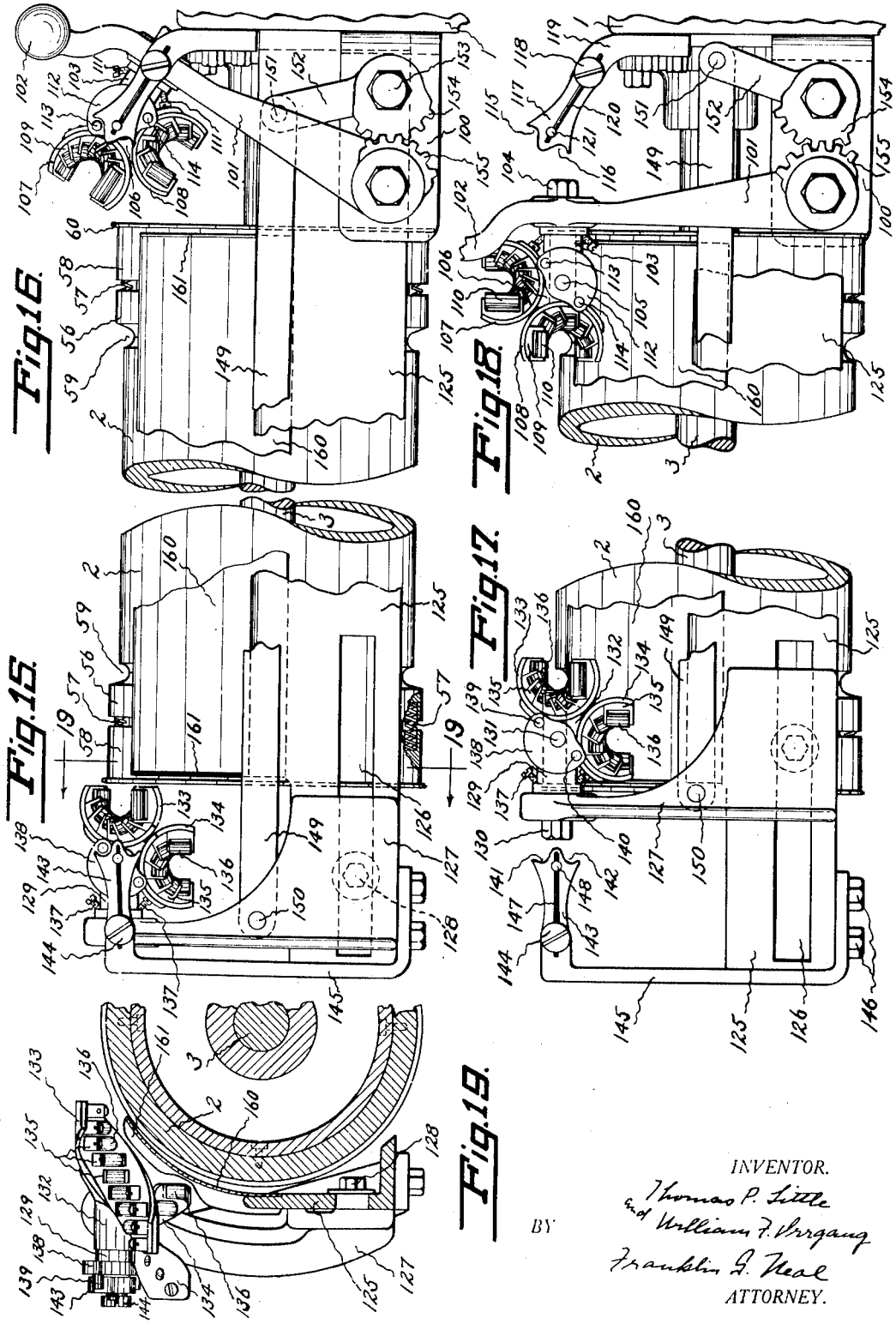

Aug. 6, 1929.  T. P. LITTLE ET AL  1,723,565
METHOD AND APPARATUS FOR BUILDING BAND TIRE CARCASSES
Filed Aug. 12, 1926  8 Sheets-Sheet 6

INVENTOR.
Thomas P. Little
and William F. Vhrgang
Franklin G. Neal
BY
ATTORNEY.

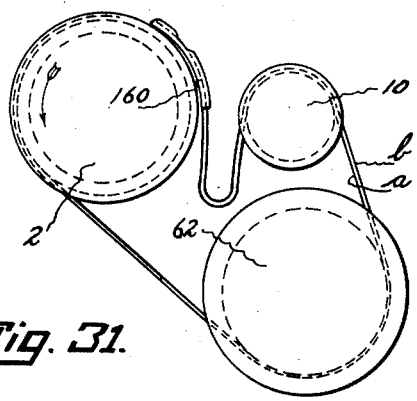
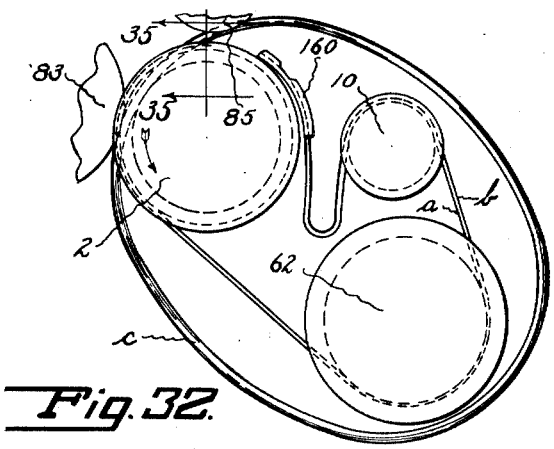
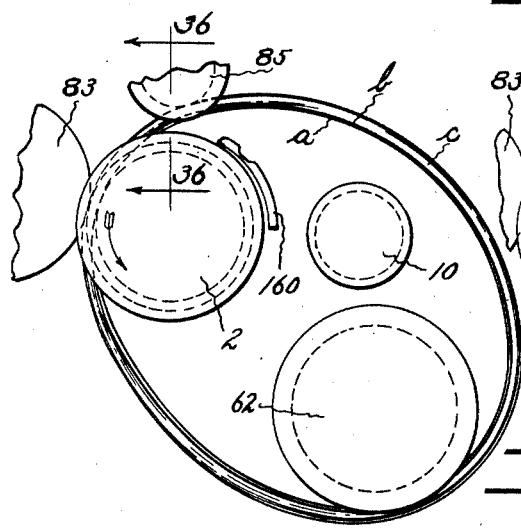
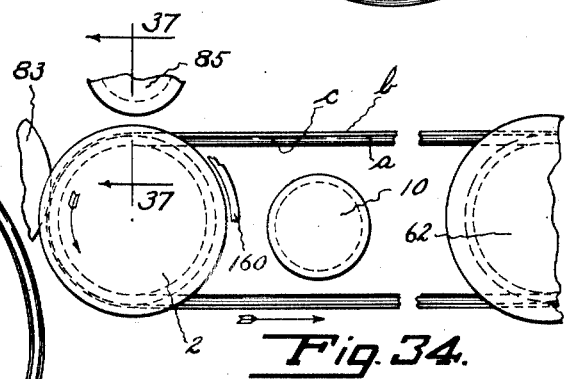
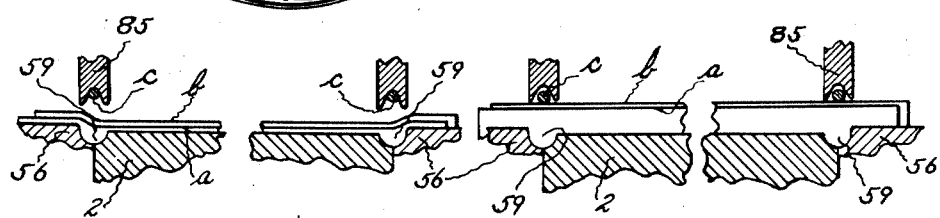
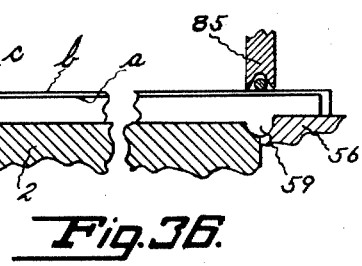
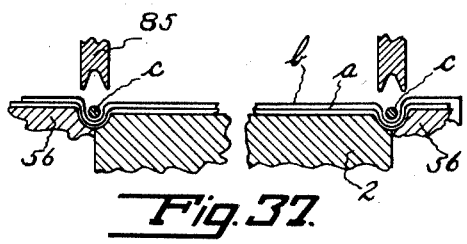

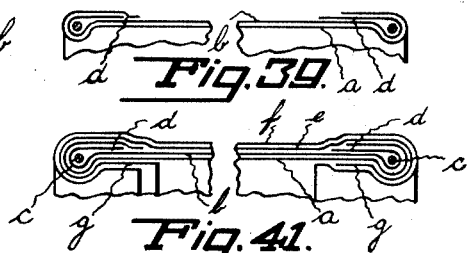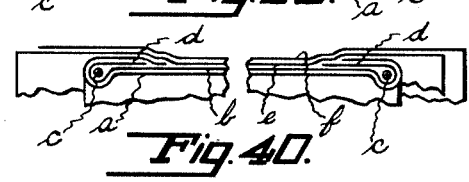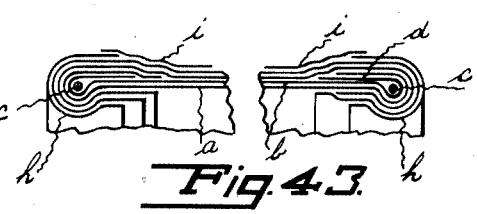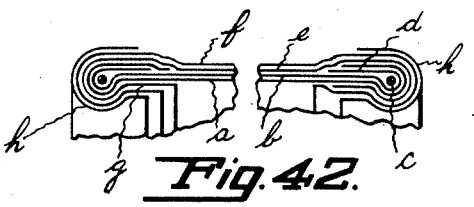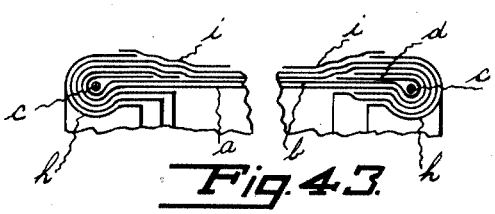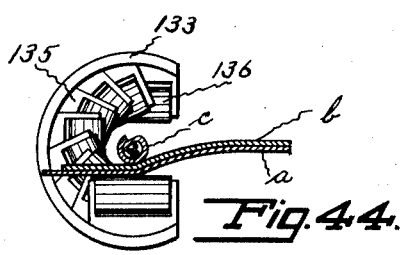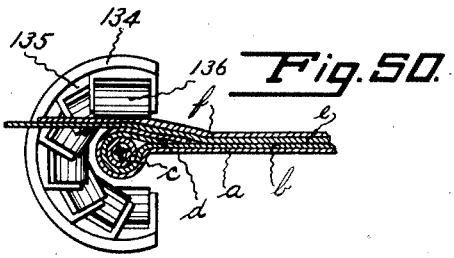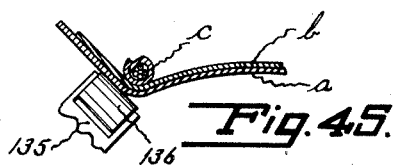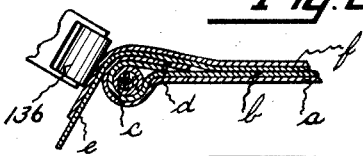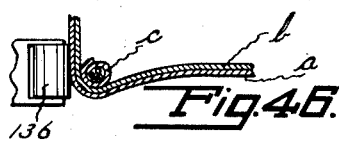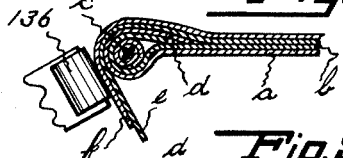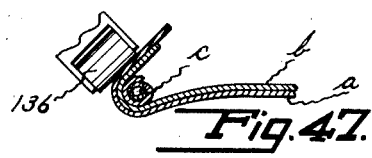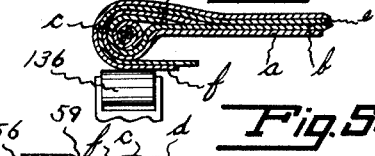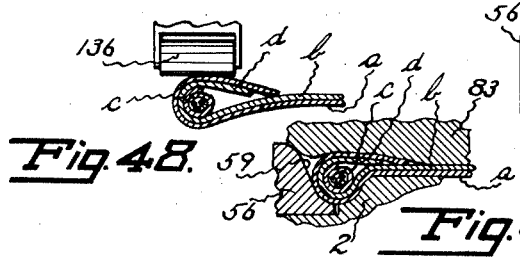

Patented Aug. 6, 1929.

1,723,565

UNITED STATES PATENT OFFICE.

THOMAS P. LITTLE, OF CHICOPEE FALLS, AND WILLIAM F. IRRGANG, OF CHICOPEE, MASSACHUSETTS, ASSIGNORS TO THE FISK RUBBER COMPANY, OF CHICOPEE FALLS, MASSACHUSETTS, A CORPORATION OF MASSACHUSETTS.

METHOD AND APPARATUS FOR BUILDING BAND TIRE CARCASSES.

Application filed August 12, 1926. Serial No. 128,722.

This invention relates to the manufacture of tire carcasses in band form, and is especially designed to facilitate the building of casings of the type having inextensible beads, the tire being first constructed in band form and later expanded to tire shape.

It is one object of our invention to provide a method of building band tire casings in which the carcass plies are folded in reverse directions around the anchorages of the bead edges of the casing. It is another object of our invention to provide a machine in which this reverse folding of the plies can be accomplished without hand operations and without removing the tire from the machine. It is another object of the invention to provide a machine for building band tires which will be compact and rapid in operation, and which will minimize the time consumed both in building the tire and in removing a finished tire from the machine and preparing for the building of a succeeding one. It is another object of our invention to provide improved mechanism for applying covering material, such as the sidewall and chafing strip, to a band carcass before it is shaped. It is another object of our invention to improve generally the means for obtaining accurate alignment between the successive plies of building material from which the tire is formed. Other and further objects will appear from the following description and claims.

Referring to the drawings—

Fig. 1 is a front elevation of a machine embodying my invention;

Fig. 2 is a side elevation thereof, partly broken away;

Figs. 3 and 4 are sections on line 3—3 of Fig. 2, illustrating the parts in different positions of operation;

Fig. 5 is a top plan view of the machine;

Fig. 6 is a detail of the guiding mechanism for the chafing strips, showing on a slightly larger scale and without other parts the same portion of the machine as is illustrated in Fig. 22;

Figs. 7 and 8 are details of edge-folding devices;

Fig. 9 is a partial front elevation of the machine, showing it set for the application of the third and fourth carcass plies;

Fig. 10 is a detail illustrating the co-action of certain of the rolls shown in Figs. 1 and 5, taken in a different operative position;

Fig. 11 is a section on line 11—11 of Fig. 2;

Fig. 12 is a section on line 12—12 of Fig. 1;

Fig. 13 is a side view of parts shown in Fig. 11, partly broken away;

Fig. 14 is a side elevation of the parts shown in Fig. 11, partly in section;

Fig. 15 is a detail showing the edge-folding devices at one side of the tire, the folders being shown in their inactive position;

Fig. 16 is a similar view of the devices at the other side of the tire, showing the parts in their inactive position;

Fig. 17 is a view similar to Fig. 15 showing the folders in operative position, and set for the application of the first two plies;

Fig. 18 is a view similar to Fig. 16 showing the parts in their operative position, but with the folders set for the application of the third and fourth plies;

Fig. 19 is a section on line 19—19 of Fig. 15;

Fig. 20 is a top plan of portions of the machine, the parts being set for the application of a chafing strip;

Fig. 21 is a view of the same parts set for the application of the sidewall strips;

Fig. 22 is an end elevation of the parts shown in Fig. 20;

Fig. 23 is an end elevation of the same parts with the guides moved to correspond with the position shown in Fig. 21;

Fig. 24 is a detail of one of the band supporting rolls;

Fig. 31 is a diagrammatic view showing the manner of preparing the first two plies for application to the bead anchorages;

Fig. 32 is a similar view showing the bead anchorages arranged around the first two plies;

Fig. 33 is a similar view showing the first two plies attached to the bead anchorages throughout their circumference;

Fig. 34 is a similar view showing the first two plies and the bead anchorages ready for the operation of the folding devices;

Fig. 35 is a section on line 35—35 of Fig. 32;

Fig. 36 is a section on line 36—36 of Fig. 33;

Fig. 37 is a section on line 37—37 of Fig. 34;

Fig. 38 is a diagrammatic cross-sectional view corresponding to Fig. 37;

Fig. 39 is a similar view showing the edges of the first two plies folded around the beads;

Fig. 40 is a similar view showing the application of the third and fourth plies;

Fig. 41 is a similar view showing the folding of the third and fourth plies around the beads;

Fig. 42 is a similar view showing the application of the chafing strips;

Fig. 43 is a similar view showing the application of the sidewall strips;

Fig. 44 is a detail showing the manner in which the folding devices act upon the first two carcass plies;

Figs. 45, 46, 47 and 48 are details showing successive stages in the operation of the folders shown in Fig. 44;

Fig. 49 is a detail section showing the pressing operation upon the folded edges of the first two plies;

Fig. 50 is a view similar to Fig. 44, but showing the folders set for action upon the third and fourth carcass plies;

Figs. 51, 52 and 53 are detail views showing successive stages of the operation of the folders shown in Fig. 50; and Fig. 54 is a view similar to Fig. 49 showing the pressing operation on the folded edges of the third and fourth plies.

*Description of method (Figs. 9, 25, and 31 to 54 inc.).*

In practicing our improved method, an endless band is first made of two bias-cut plies of carcass material $a$ and $b$. These plies are preferably composed of rubberized cord fabric cut on the bias and with the angle of the cords reversed in the two plies. This band is first looped, as shown in Fig. 31, so that it assumes a size smaller than the inner circumference of the bead anchorages. These bead anchorages $c$ are now placed about the looped band, as indicated in Fig. 32, and the band and anchorages are then rotated, contact occurring at only one point, until the band has been gradually stuck to the inner periphery of the bead anchorages. This condition is illustrated in Fig. 38. The edges of the plies are then folded outwardly around the bead anchorages as at $d$ in Fig. 39, and are pressed into firm adherence with the underlying ply $b$.

Figure 25:
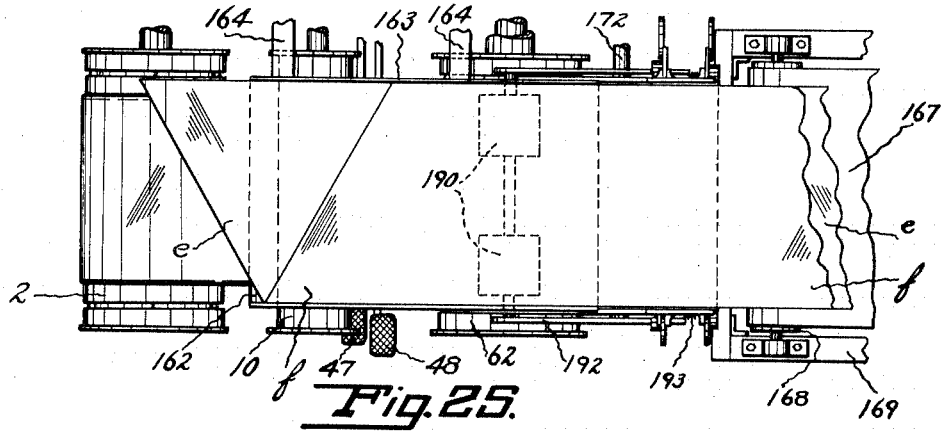
Fig. 25 is a top plan view, corresponding to Fig. 5 but showing the parts arranged for the application of the third and fourth carcass plies.
Figures 26, 27:
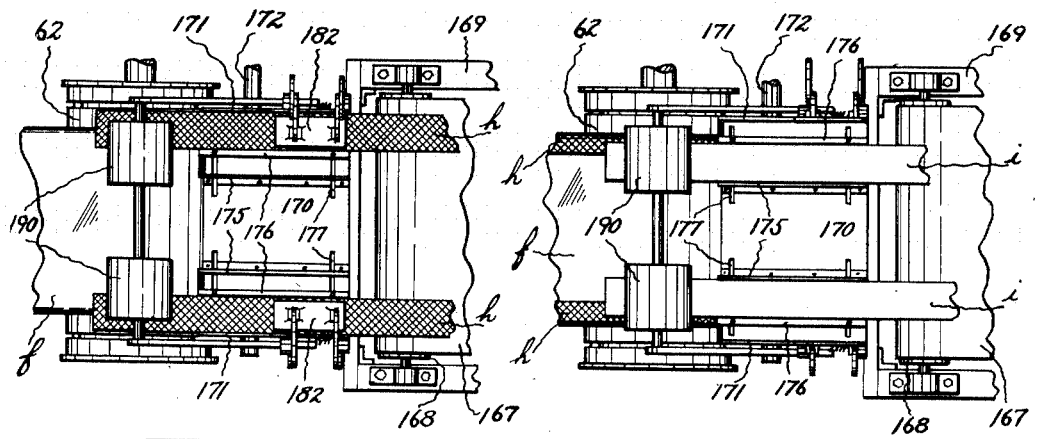
Fig. 26 is a detail plan corresponding to Fig. 20, but showing rather more of the machine.
Fig. 27 is a similar view corresponding to Fig. 21.

The third and fourth carcass bias-cut plies $e$ and $f$ are laminated into a straight strip having a cord angles in the two plies reversed as indicated in Fig. 25, and as also indicated in that figure having the ends of the strip formed with a single ply portion formed by reason of this reversal of angularity. This two-ply strip is laid on the endless band comprising the first two plies and the bead anchorages, being fed tangentially as indicated in Figs. 9 and 25. As the band is applied it is pressed into adherence with the underlying rubberized material, forming together with this material an endless band of four-ply thickness. The edges of the third and fourth plies are folded inwardly around the bead anchorages as at $g$ in Fig. 41, and are pressed into firm adherence with the ply $a$.

While this completes the building of the carcass of the tire, we prefer to fold around the edges of the tire band a pair of chafing strips $h$ and also apply sidewall strips $i$. The application of the remaining covering rubber, such as the breaker strip and the tread, is conveniently left until the endless band has been expanded to tire form, although it may if desired be done before.

*Main drive (Figs. 1, 2, 11 to 14, and 31).*

The machine is mounted upon a main frame 1, upon which the other parts to be described are mounted either directly or upon suitable brackets. The particular formation of these brackets will not be described in detail as their construction will be obvious. Journaled in this frame is a rotatable roll 2, the shaft 3 of which passes through the frame from side to side and carries on its rear end a sprocket 4. Around sprocket 4 passes a chain 5, which also runs over a sprocket 6 on a shaft 7 and a sprocket 8 on the shaft 9 of what may be termed for convenience a looper roll 10. This looper roll serves the purpose of maintaining the endless band, composed of the first two plies, in a looped formation as is best shown in Fig. 31.

The shaft 7 is driven by a clutch mechanism operable to rotate it in either direction as may be desired by the operator, and is subjected to a braking action when it is not being positively driven in order to hold the parts against undesired rotation. For this purpose the shaft 7 carries a clutch or brake drum 11 adapted to be frictionally rotated in either direction by rolls 12 and 13 brought into alternate operation by mechanism to be described. The roll 12 is mounted on the inside of the drum and the roll 13 on the outside. These two rolls are journaled in an arm 14 pivoted for a slight swinging motion upon the main drive shaft 15. The shaft 16 of roll 12 also carries a gear 17 and the shaft 18 of roll 13 carries a gear 19. A shaft 20, likewise journaled in the arm 14, carries a gear 21 which meshes with both gears 17 and 19. Shaft 20 also carries a sprocket 22 around which passes a chain 23. This chain likewise passes around a sprocket 24 secured to the main shaft 15. The main shaft 15 may be driven continuously in any desired manner, a convenient method being to provide it with a gear 25 meshing with a pinion 26 on the shaft of a motor 27.

As stated above, the shaft 7 is provided with a brake which holds it against rotation at all times except when it is being positively rotated. For this purpose a brake band 28 extends over the surface of drum 11 and is secured at one end by lock-nuts 29 to a bracket 30. At its other end the brake band is provided with an abutment 31 having pivoted to it a rod 32 and being constantly urged downwardly by a spring 33 encircling the rod. An over-hanging portion 34 of the bracket 30 serves as a guide for the rod and as an abutment for the spring 33.

Adjacent the lower surface of abutment 31 is mounted a cam shaft 35 having circular ends 36 (Fig. 13) mounted in vertical slots 37 in the bracket 30. Intermediate its ends the shaft 35 is formed with a flat cam 38 (Fig. 11) lying between the abutment 31 and a fixed abutment 39 on the bracket. If the shaft is rotated in either direction the abutment 31 will be cammed upwardly against the resistance of spring 33. As the abutment 39 is fixed this will be accompanied by a slight rising of the center of shaft 35, allowed for by the slots 37.

The cam shaft 35 is rocked by an arm 40 fixed to it and pivoted at its other end at 41 to a vertical rod 42. Upon this rod are upper and lower collars 43 held in position by locknuts 44. Springs 45 are interposed between the collars 43 and an extension 46 of the arm 14. The lower end of rod 42 is pivoted to two treadles 47 and 48 respectively. Treadle 47 is pivoted at 49 at a point to the rear of the machine, and treadle 48 at a point 50 at the front of the machine, both of these pivots being carried by brackets 51 on the main frame 1. By reason of this structure depression of treadle 47 will cause the rod 42 to be pulled downwardly, treadle 48 meanwhile rising; while a reverse action will take place upon depression of treadle 48.

Considering the operation of this much of the device, let it first be assumed that treadle 47 is depressed. Rod 42 will thereby be drawn down, carrying with it the outer end of arm 14. This brings roll 12, which is constantly driven by its geared connection with shaft 15, against the inner periphery of clutch drum 11. The upper spring 45 is meanwhile compressed. At the same time the arm 40 is drawn down so as to rock cam shaft 35 in a clockwise direction as viewed in Fig. 11. The tilt thus given to the cam 38 raises abutment 41 and releases the brake band 28 from the outer surface of the drum 11. The rolls 2 and 10 will by this means be driven positively in a clockwise direction as viewed in Fig. 1. If the treadle 47 is now released, the springs 33 and 45 return the parts to normal, the roll 12 being removed from contact with the inner surface of the drum and the brake band being drawn into contact with its other surface, thereby arresting the rotation of drum 11 and the rolls 2 and 10.

If, instead of treadle 47, treadle 48 is depressed, the rod 42 will be raised instead of being depressed. This brings roll 13 into contact with the outer surface of the drum 11 and causes rotation of the latter in the opposite direction from that caused by contact of roll 12. At the same time the lower spring 45 is compressed and the arm 40 raised, rocking cam shaft 35 in a counter-clockwise direction. The result on the brake drum 28 is the same as before since the flat cam 38 extends to both sides of the cam shaft. Here again, the parts will be returned to normal by the springs upon release of the treadle.

*Band supporting and looping devices (Figs. 1–5, 10, 24, 31–34, 49 and 54).*

The roll 2 previously referred to constitutes the means for rotating the bead wires and the partially constructed tire band so that they may be operated upon by the remainder of the mechanism. As described above, this roll can be rotated in either direction and when the machine is idle it is held by the brake against rotation. In its preferred construction this roll has longitudinally movable end sections 56 (Fig. 24) pressed by springs 57 against the central portion of the roll, the springs bearing against end collars 58. The end sections and the main portion of the roll are shaped at their intersections so as to form grooves 59 in which the tire bead is received. The springs permit a slight lateral expansion of this groove to accommodate the thickening of the bead as additional plies of material are put in place, and also serve to press the folded marginal edges of the band tightly around the bead anchorages. In order to prevent the fabric bands from slipping over the ends of the roll, it is preferably provided with flanges 60.

The looper roll 10 previously described as mounted on driven shaft 9, has a plane surface with end flanges 61 (Fig. 2). The relation of the diameters of the rolls 2 and 10 and the number of teeth on the sprockets 4 and 8 is preferably chosen so that the surface speed of roll 10 will be slightly, say about five percent, greater than the surface speed of roll 2. This difference in speed is useful in maintaining the endless band formed of the first two plies $a$ and $b$ in the looped shape shown in Fig. 31. The band in that figure is shown as having a loop or slack portion between the rolls 2 and 10, being drawn taut for the remainder of its circumference. This avoids sagging of the band during the operation of attaching it to the bead wires.

Coacting with the rolls 2 and 10 in forming the original loop of fabric, and with the roll 2 in subsequent operations, is a roll 62 constructed in all respects like roll 2 except that it is freely rotatable instead of being positively driven. This roll is pivoted upon an arm 63, best shown in Figs. 1, 3 and 4, which is fast upon a shaft 64 mounted in a bearing 65 on the main frame. A crank 66 (Fig. 3) is also secured to the shaft 64 and is joined by a link 67 with a piston rod 68. The lower end of the piston rod carries a piston 69 running in a cylinder 70. At the point where the link 67 joins the piston rod the latter is provided with a cross-head 71 running in guides 72 in the frame. At the top of the cylinder 70 is an air pipe 73 (Fig. 3) and at the bottom a pipe 74 (Fig. 1). These two pipes are controlled by a valve 75 by which either one may be connected to an air line 76. By actuating the valve the arm 63 and the roll 62 can be held in either the full or the dotted line positions of Fig. 1. The full line position of Fig. 1 corresponds with Fig. 3 and the dotted line position with Fig. 4.

The position of these rolls at the start of the tire building operation is shown in Figs. 1 and 31. After the band comprising the first two pockets has been placed around the rolls and looped as shown in Fig. 31 by the drag exerted by the higher surface speed of roll 10, the bead wires c are applied in a manner to be described below. After the bead wires have been applied the valve 75 is actuated and rollers 62 swung into the dotted line position of Fig. 1, corresponding with the position shown in Fig. 34. In this position the tire band is drawn out into a horizontally elongated oval and entirely clears the roll 10. Subsequent building operations upon the band, such as the placing of the third and fourth fabric layers and the addition of the covering material, take place while the roll 62 is in the latter position.

*Bead setting and fabric pressing devices (Figs. 1, 2, 5, 10 and 32–35).*

Upon a shaft 80 (Fig. 1), running through the main frame in a direction parallel to shaft 3, are arms 81 carrying between them a shaft 82. Upon this shaft is mounted a roller 83, preferably of a yielding rubber composition. The arms 81 also carry a shaft 84 upon which are mounted spaced bead setting rollers 85 having grooves 86 (Figs. 2 and 5) in them to receive and guide the bead anchorages. The arms 81 and the rollers carried by them have two positions—an inactive position shown in full lines in Fig. 1, and an active position shown in dotted lines in this figure.

When in the latter position the roll 83 is in contact with roll 2, or with the tire band thereon, while the rolls 85 are slightly spaced from the surface of the band as shown in Fig. 35.

In order to swing the arms 81 into one or the other of these positions, the shaft 80 is provided with a crank 87 (Fig. 1) connected by a link 88 with the piston rod 89 of a pneumatic cylinder 90. A pipe 91 is connected with the top of the cylinder and a pipe 92 with the bottom, these two pipes being controlled by a valve 93 connecting them alternately with an air line 94. By turning the air valve in one direction or the other the fabric pressing roll 83 and the bead setting rolls 85 can be moved quickly into either operative or inoperative position.

*Folders (Figs. 1, 2, 5, 7, 8, 15–19, 28, 29, 30 and 44–53).*

Located so as to operate upon the carcass band when the latter is stretched out into oval form, as in Fig. 34, are two sets of edge folding devices adapted to fold the carcass material around the bead anchorages. Since the first band of carcass material is applied to the inner circumference of the beads, it is folded outwardly; whereas the second band is applied to the outer circumference of the anchorages and is folded inwardly. For this reason we have supplied the folding devices in two sets adapted for alternate operation. The folding devices operate upon the material just before this reaches the roll 2, and as indicated in Figs. 44–49 and in Figs. 50–54 folds the material around the anchorages in position to be pressed into adhesive contact with the body of the carcass band by the joint action of roll 2 and pressing roll 83.

Considering first the folding unit mounted adjacent the frame of the machine, which is that shown in Figs. 16 and 18, a bracket 100 is provided upon which is pivoted an arm 101 having a handle 102. To this arm is fastened a boss 103 by a nut or stud 104. The boss carries a bearing member 105 conveniently in the form of a stud extended parallel to the pivot of arm 101. A folder carrying member 106 has a limited rotative movement upon this bearing and carries cages 107 and 108 in which are carried the folding members themselves. In the form shown the cages are composed of a strip of sheet metal in helical form, conveniently obtained by cutting a helical strip from a piece of pipe, and are provided on their inner surfaces with lugs 109 in which are journaled the folding rolls 110. Stops 111 in the form of set screws are mounted upon the boss 103 in order to limit the rotative movement of the folder carrying member 106.

Mechanism is provided for causing the cages 107 and 108 to be presented alternately for operation upon the fabric. This mechanism comprises a disk 112 secured to the carrier member 106, upon which are mounted pins 113 and 114. These pins coact, in a manner to be more fully described below, with recesses 115 and 116 respectively, formed in the end of an arm 117 pivoted at 118 to a bracket 119 secured to the main frame 1. The arm is held in a neutral position by a spring 120 (Fig. 18) secured to the pivot 118 and passing through a hole in a pin 121 attached to the arm. The operation of this much of the folding mechanism will be described in connection with the operation of the unit opposed to it, which is more fully illustrated in the drawings.

This other folding unit, illustrated in Figs. 15, 17 and 19 and having parts thereof illustrated in Figs. 7, 8, 28, 29 and 30, is supported upon an angle iron 125 projecting from and fixed in any suitable manner in the main frame 1. Near its end this angle iron is provided with a slot 126 into which fits a sliding bracket 127 held loosely in place by a stud 128. At the top of this bracket is mounted a boss 129 (Figs. 7, 8, and 17) by a nut 130. The boss carries a pivot pin 131, similar to the pivot 105, and upon this pivot is mounted a folder carrying member 132. This carrier member carries cages 133 and 134 provided with lugs 135 carrying rolls 136, similar to the rolls 110 of the folder described previously. Stops 137 are arranged similarly to stops 111.

The means for rocking the carrier member to press either one of the cages into operative position is generally similar to the operating mechanism for the folder shown in Fig. 16. A disk 138 is mounted upon the member 132 and carries pins 139 and 140 coacting respectively with recesses 141 and 142 in the end of an arm 143. This arm is pivoted at 144 upon a bracket 145 secured by bolts 146 to the angle iron 125. A spring 147 is secured to the pivot 144 and passes through a hole in a pin 148 upon the arm.

Both folders are operated by the handle 102, being shifted alternately to inoperative position by a motion of the handle toward the frame of the machine, or away from the operator, and moved into operative position by a reverse motion of the handle. For this purpose a link 149 is pivoted at 150 to the bracket 127 and at its other end is pivoted at 151 to an arm 152 pivoted at 153 to bracket 100. Arm 152 and arm 101 are fitted with meshing gear segments 154 and 155, so that they move simultaneously in opposite directions. A motion of handle 102 to the left in Fig. 16 will cause the link 149 to move toward the right, pulling bracket 127 with it. By this motion the folders are caused to approach or recede from the edges of the carcass band simultaneously.

Before considering the manner in which the mechanism described above functions, it will be well to examine the cages themselves to see how they differ. Contrasting Figs. 44 and 50, it will be seen that the cage 133 has its lugs arranged in a right handed spiral, while the cage 134 has its lugs arranged in a left handed spiral. When cage 133 is in position and the unfolded carcass band is passed through it in a direction away from the reader, it will be seen that the marginal portions of the band will be folded upwardly and around the anchorage $c$ as shown in Figs. 45 to 47. With the cage 134 in position the exact reverse takes place, the left handed spiral arrangement of the rolls causing the fabric to be turned downwardly and around the bead anchorages as shown in Figs. 51 and 53. The folders at the other side of the band are similarly arranged although the direction of the helix is reversed in corresponding cages, the cage 107 which folds the fabric upwardly around the anchorage being arranged in a left handed spiral while the cage 108 which corresponds to the cage 134 is arranged in a right handed spiral.

Figures 28, 29:
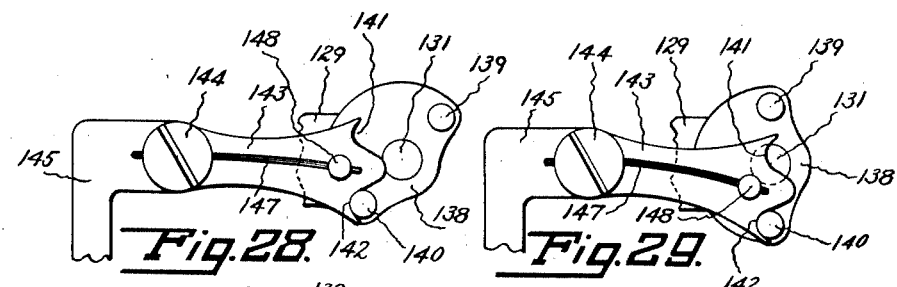
Figs. 28, 29 and 30 are details illustrating the manner of operation of certain of the parts shown in Fig. 15.
Figure 30:
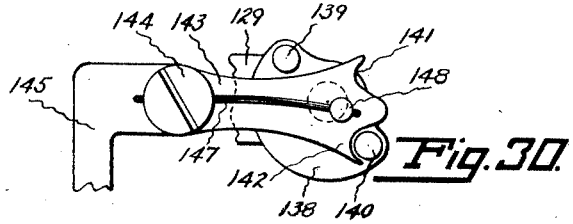

The shifting mechanism is arranged to cause a reversal of the position of the cages each time the handle 102 is operated to shift the folding mechanism to the inoperative position shown in Figs. 15 and 16. With the parts in the position of Figs. 15 and 16 a motion of the handle 102 toward the operator (to the left in Fig. 16) will cause the folders to move towards each other. Fig. 18 similarly shows an operative position of the folders, but in this case the folders for operating upon the second band rather than upon the first are shown in action. The manner in which the shift is made is illustrated in detail in Figs. 28, 29 and 30. As the folder unit shown in Fig. 17 is moved to the left into inactive position, the pin 140 meets the recess 142 in arm 143 as shown in Fig. 28. This causes the disk 138, and consequently the carrier 132, to be rocked into the position shown in Fig. 30. An intermediate position is shown in Fig. 29, in which it will be seen that the pivotal mounting of arm 143 permits the arm to follow the pin 140 as the latter turns about the pivot 131. Normally the arm 143 is held in a central or neutral position by the spring 147. The parts are now in the position of Fig. 15 except that the cage 133 is located directly at the top of the folding unit and cage 134 is in the position occupied in Fig. 15 by cage 133. A motion of the handle 102 to the left in Fig. 16 will cause the cage 134 to be brought into the operative position of Fig. 17, occupied in that figure by cage 133. A second right hand motion of handle 102 will cause the cages to be again reversed. It will be noted that in Fig. 16 the cage 107 is shown ready to be moved into operative position, whereas in Fig. 18 it is cage 108 that is in operation. The figures are to this extent not consecutive, there having been an intermediate double throw of the handle 102 between them.

In order to hold the cages firmly in position during their operation, they are provided with a toggle spring action which has been illustrated in Figs. 7 and 8 for the folder shown in Fig. 15. The opposite folder unit is provided with a similar device which has not been illustrated since it is a duplication of that shown. This toggle spring 156 is tensioned between pins 157 and 158, the former being upon the carrier 132 and the other upon the boss 129. As shown by a comparison of Figs. 7 and 8, this spring tends to keep the center line of the pins either on one side or the other of the pivot 131, holding the cages firmly against either one or the other of stops 137. This arrangement prevents any motion of the cages except when they are turned by the contact of pins 139 and 140 with arm 143.

*Fabric guides (Figs. 1, 2, 5, 9, 15, 19 and 31–33).*

The first two plies a and b are built up in the form of an endless band and are looped around the rolls 2, 10 and 62 as shown in Fig. 31. The only guiding device necessary for this band beyond the rolls themselves is a curved member 160 having upturned edges 161, perhaps shown best in Fig. 19 and also appearing in Figs. 9, 15, 16, 19 and 31. This member is attached to the angle iron 125, which supports the outer set of edge folders and guides the fabric smoothly and accurately onto the surface of roll 2.

The third and fourth plies e and f are fed tangentially to the outer circumference of the composite band when the latter has been stretched out into the position of Fig. 34. For guiding this two-ply strip a tray 162 is provided, which, as shown in Fig. 9, is arched to clear other parts of the mechanism. This tray is provided with upturned edges 163 which guide the fabric laterally and is supported upon bars 164, hinged at 165 (Fig. 1) to bars or brackets 166 on the main frame. The hinges are arranged to give a limited motion so that the tray will stay either in the vertical position of Figs. 1, 2, and 5 or in the horizontal position of Fig. 9. Serving as a support for the outer end of the two-ply strip is a belt 167 carried upon pulleys 168 freely rotatable in a standard 169. This belt supports the fabric strip and delivers it to the guide without any substantial drag.

*Guides for covering material (Figs. 1, 5, 6, 9 and 20–27).*

The belt 167 previously described also assists in positioning the chafing strip and sidewalls. During the application of these elements, however, the tray 162 is moved to its vertical position where it is out of the way. The guiding mechanism for the covering strips is mounted upon a plate 170 (Figs. 20 and 22) provided with upstanding edges 171 which act as guides for the chafing strip only. The plate is carried upon a rod 172 by means of collars 173, the rod being carried upon a bracket 174 secured to the main frame. Attached to the plate are guide strips 175 which serve as guiding means for the sidewall strips only (Fig. 21). If it is desired to make the machine adjustable to deal with different widths of strips, the edges 171 and the guide strips 175 may be made laterally adjustable. For ordinary purposes, however, this is not necessary.

Transversely movable upon the surface of the plate 170 are bars 176 having projecting portions extending through slots 177 in the plate. These slots are best shown in Figs. 20 and 21. At each end of each bar is pivoted a link 178, and each link is pivoted to one end of a pair of crossed arms 179 pivoted at 180 to the plate 170. This arrangement is best shown in Fig. 21. By shifting either one or the other of the bars 176, the other will be caused to move in the same relative direction with a parallel motion. In Fig. 20 the bars are shown as brought nearer to each other than in Fig. 21, the arms 179 being crossed in the opposite direction from that of Fig. 21. The bars are placed in the position of Fig. 20 for guiding the chafing strips h, which are placed between the bars and the edges 171. In the position of Fig. 21 the other side of bars 176 is used for a guiding surface, the sidewall strips i being received between the bars and the guides 175. Rollers 181 are preferably mounted between extensions of the side edges 171 and of the guides 175 to present a smooth anti-friction surface to the covering strips as these are drawn off the plate.

To retain the chafing strips smoothly in the guiding groove formed by edges 171 and guides 176, plates 182 are provided which, as best shown in Fig. 6, rest upon the strip h and hold the latter smoothly in position. These plates are pivoted at 183 to arms 184 swinging about pivots 185 on brackets 186 attached to the plate 170. Links 187 are pivoted at 188 to the arms at one side of the machine and extend across to extensions 189 of the arms 184 at the other side of the machine (Fig. 22). The plates are thus caused to move in unison from the position of Fig. 22 to that of Fig. 23 by taking hold of the links 187 or the arms 184 as may be most convenient.

Rollers 190 are provided to contact with the tire carcass at a point above roll 62 in order to press the covering strips into firm adherence with the underlying material. These rolls are carried upon a shaft 191 bridged between arms 192 pivoted upon the rod 172. Springs 193 (Fig. 9) stretched between the arms and a fixed point on the machine, constantly urge the roller downwardly with a yielding pressure.

Operation.

In starting the construction of a tire casing the roll 62 is in its lower position, shown in full lines in Fig. 1 and also in Fig. 31. The tray 162 is up as in Fig. 1. The roll 83 is in its inactive position shown in full lines in Fig. 1. With the parts in these positions the two plies a and b, previously formed into an endless band, are placed about the rolls 2, 10 and 62 as in Fig. 31 with a loop of material between the rolls 2 and 10. The bead anchorages c are then sprung about the rolls 2 and 62, being positioned by the grooves 59 in the rolls and also by the grooves in the bead positioning rolls 85. The machine is now started by depressing treadle 48 so as to cause the roll 2 to travel in the direction of the arrow in Fig. 32. This operation is continued until the entire circumference of the band has been stuck by the pressing action of rolls 2 and 83 to the inner circumference of the bead anchorages c. This condition is shown in Figs. 33 and 36.

Roll 62 is now swung upwardly into the dotted line position of Fig. 1, stretching the composite endless band into an elongated oval as shown in Fig. 34. This prepares the band for the edge folding operation. The operator draws the handle 102 toward him, or to the left in Fig. 16, causing the cages 107 and 133 to be pulled into operative position as illustrated in Figs. 17 and 44. The operation of the folders is indicated in Figs. 44 to 48. After the edge b has been turned completely around the bead anchorage, it is received between rolls 2 and 83 and is firmly pressed against the underlying carcass ply b as in Fig. 49. The folders are now withdrawn by the operator pushing handle 102 away from him, this operation automatically setting the cages 108 and 134 in position for the next operation.

The tray 162 is then lowered into its horizontal position and the third and fourth plies, laminated into a straight strip, are fed over the tray to the partially completed tire band, as shown in Figs. 9 and 25. The front edge of the strip is pressed laterally by hand against the underlying partial carcass and rotation in the direction of the arrow in Fig. 9 continued until the band has been drawn on. The handle 102 may now be again drawn toward the operator to bring cases 108 and 134 into position as shown in Figs. 18 and 50, folding the edge g around the bead anchorages so that it will pass between the roll 2 and the carcass band as shown in Fig. 54. The tension of the band around the roll causes sufficient pressure to stick this turned over edge firmly in place, but if desired pressure may be augmented by roll 83.

The tray 162 is now raised to its vertical or inactive position and guides 176 moved inwardly to the position of Fig. 20. Chafing strips h are now led in the guiding grooves thus formed and plates 182 are lowered to hold them in place. The leading end of the chafing strips is now drawn over rolls 81 and under rolls 190 to the tire carcass, continued rotation of the latter around the rolls drawing the chafing strips into place and positioning them completely around the circumference.

If the folding cages 108 and 134 have been used as described above for the edges of the plies e and f, they are left in position while the chafing strip is being applied, thus carrying the chafing strip around the bead as shown in Fig. 42. If desired, however, the folding of the plies e and f may be deferred until the chafing strips have been applied, in which case margins of the plies and the chafing strips are folded as a single operation. In either case the folders are withdrawn by pushing handle 102 away from the operator after the chafing strips have been completely applied. This operation re-sets the cages 107 and 133 for operation upon the first two plies of a succeeding tire band.

Plates 182 are now raised and bars 176 shifted to their outward position of Fig. 21. Sidewall strips i are then laid in the guiding grooves formed between guides 175 and bars 176 and are drawn onto the partially completed carcass in the same manner as the chafing strip, except that there is no folding of the sidewall strips around the beads. After the sidewall strips have been completely applied, roll 83 is withdrawn by actuating valve 193, roll 62 lowered by actuating valve 75, and the tire band, completed as far as machine operation goes, is removed. No provision has been shown for guiding a strip of tread stock in place as, in the operation for which this machine is designed, it is preferable to apply the tread after the tire band has been expanded to tire shape. If desired, however, the tread band may be applied by guiding means similar to these described.

Having thus described our invention, we claim:

1. A method of building a tire band which comprises forming an endless band of carcass material, looping the band so that it may lie within the circumference of a bead anchorage, placing a pair of spaced bead anchorages around the looped band, and pressing the band progressively against the inner periphery of the anchorages.

2. A method of building a tire band which comprises forming an endless band of carcass material, looping the band so that it may lie within the circumference of a bead anchorage, placing around the looped band a pair of bead anchorages spaced apart a distance less than the width of the band, pressing the band progressively against the inner periphery of the anchorages, and folding the margins of the band outwardly around the anchorages.

3. The method of building a tire carcass which comprises forming an endless band of carcass material, looping the band so that it may lie within the circumference of a bead anchorage, placing around the looped band a pair of bead anchorages spaced apart a distance less than the width of the band, pressing the band progressively outwardly against the inner periphery of the anchorages, folding the margins of the band outwardly around the anchorages, feeding tangentially to the outer circumference of the band a strip of carcass material of a width greater than the distance between the bead anchorages, pressing the strip against the band and the folded margins thereof, and folding the margins of the strip inwardly around the anchorages.

4. In a machine for making tire bands, a plurality of rollers for holding an endless band of carcass building material with a loop thereof between two of the rollers, means for rotating the rollers so as to give a surface speed to one of them greater than that given to the succeeding one, whereby to preserve the loop, and means for supporting a pair of bead anchorages around the looped band for application thereto.

5. In a machine for making tire bands, a driven roll, a second driven roll of smaller diameter, a third roll movable from a position where its center is substantially in line with the centers of the other two rolls to a position where the three centers are arranged in the form of a triangle, whereby a band may be looped around the rolls when the rolls are in triangular position and straightened out to clear the small roll when the rolls are in straight line position.

6. In a machine for making tire bands, means for supporting a pair of bead anchorages with a layer of carcass building material applied thereto, folding devices operable to fold the marginal edges of the material either outwardly or inwardly around the anchorages, and means for actuating the folding devices and for conditioning them automatically to fold alternately one way and then the other.

7. In a machine for making tire bands, edge-folding means comprising a device for folding a marginal edge portion of the band outwardly around an anchorage, a device for folding a marginal edge portion of the band inwardly around the anchorage, means for moving the folding means into or out of operative proximity to the anchorage, and means for causing the devices to be presented alternately in folding position.

8. In a machine for making tire bands, edge-folding means comprising a support rotatable about an axis parallel to the adjacent portion of the tire bead, a pair of helical edges of opposite hand secured to the support, a series of rollers mounted in each of the cages to form a helical anti-friction guiding surface, means for moving the support towards or away from operative position, a stop mounted to contact with the support when the latter is in its inactive position, and abutments on the support positioned to contact alternately with the stop upon repeated movements of the support into inactive position, whereby the cages are placed alternately in operative position.

9. A guide for supplying covering material to a tire band, which comprises two guiding members fixed a definite distance apart, a movable guiding member located between and parallel to them, and means for moving the movable member into either of two positions, whereby strips of different widths and different edge positions may be guided alternately by the same device.

10. A guide for supplying covering material to a tire band, which comprises a tray having edge flanges, two fixed guides secured to the tray, a pair of movable guiding members, one located between each flange and the adjacent fixed guide, and means for moving the guiding members simultaneously in opposite direction to either of two positions, whereby the tray is adapted for guiding to a tire band chafing strips and sidewalls alternately.

11. A guide for supplying covering material to a tire band, which comprises a tray having edge flanges, two fixed guides secured to the tray, a pair of movable guiding members, one located between each flange and the adjacent fixed guide, and means for moving the guiding members simultaneously in opposite direction to either of two positions, and a pair of smoothing and guiding plates movable simultaneously into or out of the guiding space between said flanges and members, whereby the tray is adapted for guiding to a tire band chafing strips and sidewalls alternately.

12. In a machine for making tire bands, means for supporting a carcass band in horizontally elongated oval form, and a carcass ply guiding tray pivoted about a horizontal axis at one side of the band so as to be positioned either across one flat side of the band or in an inactive position at one side thereof.

13. In a machine for making tire bands, means for supporting a carcass band, guiding devices for supplying covering material to the band, and a movable ply guiding tray mounted so as to be positioned either in an operative position overlying the guiding devices or in an inactive position to one side thereof.

14. In a machine for building tire bands, a band supporting roll having bead receiving grooves formed by the cutaway edges of abutting cylinders spring pressed together.

15. In a machine for building tire bands, a band supporting roll formed of three coaxial cylinders and spring means for urging the cylinders axially towards one another, the outer meeting edges of the cylinders being cut away to produce bead receiving grooves.

16. In a machine for building tire bands, a plurality of rolls for supporting a pair of bead anchorages, means for folding around the bead anchorages the marginal edges of a ply of carcass material, and means carried by the rolls for pressing the folded edges around the anchorages.

THOMAS P. LITTLE.
WILLIAM F. IRRGANG.